(12) United States Patent
Matsuda et al.

(10) Patent No.: US 11,971,504 B2
(45) Date of Patent: Apr. 30, 2024

(54) CONTROL DEVICE, IRRADIATION DEVICE, CONTROL METHOD, AND COMPUTER PROGRAM

(71) Applicant: PIONEER CORPORATION, Tokyo (JP)

(72) Inventors: Takehiro Matsuda, Kawagoe (JP); Toshio Maehara, Kofu (JP)

(73) Assignee: Pioneer Corporation, Tokyo (JP)

( * ) Notice: Subject to any disclaimer, the term of this patent is extended or adjusted under 35 U.S.C. 154(b) by 840 days.

(21) Appl. No.: 17/041,404

(22) PCT Filed: Mar. 20, 2019

(86) PCT No.: PCT/JP2019/011642
§ 371 (c)(1),
(2) Date: Sep. 24, 2020

(87) PCT Pub. No.: WO2019/188639
PCT Pub. Date: Oct. 3, 2019

(65) Prior Publication Data
US 2021/0364606 A1   Nov. 25, 2021

(30) Foreign Application Priority Data

Mar. 27, 2018   (JP) ................................. 2018-059344

(51) Int. Cl.
*G01C 3/08*   (2006.01)
*G01S 7/481*  (2006.01)
(Continued)

(52) U.S. Cl.
CPC ............ *G01S 7/4817* (2013.01); *G01S 7/484* (2013.01); *G01S 7/495* (2013.01); *G01S 17/48* (2013.01); *G01S 17/86* (2020.01)

(58) Field of Classification Search
None
See application file for complete search history.

(56) References Cited

U.S. PATENT DOCUMENTS 8,098,414 B2   1/2012   Nojima
9,046,599 B2   6/2015   Morikawa et al.
(Continued)

FOREIGN PATENT DOCUMENTS

JP   H0675050 A       3/1994
JP   2001027737 A    1/2001
(Continued)

OTHER PUBLICATIONS

Office Action received in corresponding Japanese Patent Application No. 2020-510771, dated Sep. 27, 2022, in 3 pages.
(Continued)

*Primary Examiner* — Mark Hellner
(74) *Attorney, Agent, or Firm* — Procopio, Cory, Hargreaves & Savitch LLP

(57) ABSTRACT

A control device (10) includes a control unit (100). The control unit (100) controls a plurality of irradiation devices (20) that emit electromagnetic waves. The control unit (100) outputs a plurality of first periodic signals for respectively controlling movements of the irradiation directions of the electromagnetic waves to a first direction in the plurality of irradiation devices (20), and a plurality of second periodic signals for respectively controlling movements of the irradiation directions of the electromagnetic waves to a second direction in the plurality of irradiation devices. The periods of the plurality of first periodic signals are the same as each other. The effective repetition number of the movement of the irradiation direction to the second direction, while the irradiation direction is moved one period to the first direction, is the same for the plurality of irradiation devices.

8 Claims, 14 Drawing Sheets

(51) Int. Cl.
*G01S 7/484* (2006.01)
*G01S 7/495* (2006.01)
*G01S 17/48* (2006.01)
*G01S 17/86* (2020.01)

(56) References Cited

U.S. PATENT DOCUMENTS

| | | |
|---|---|---|
| 9,869,754 B1 | 1/2018 | Campbell et al. |
| 10,267,898 B2 | 4/2019 | Campbell et al. |
| 10,564,436 B2 | 2/2020 | Nakamura |
| 2009/0141192 A1 | 6/2009 | Nojima |
| 2014/0062759 A1 | 3/2014 | Morikawa et al. |
| 2018/0143446 A1 | 5/2018 | Nakamura |
| 2018/0217258 A1* | 8/2018 | Hirasawa ............... G01S 17/86 |
| 2018/0275249 A1* | 9/2018 | Campbell ............... G01S 17/42 |
| 2019/0250254 A1 | 8/2019 | Campbell et al. |

FOREIGN PATENT DOCUMENTS

| | | |
|---|---|---|
| JP | 2004028753 A | 1/2004 |
| JP | 2007121581 A | 5/2007 |
| JP | 2009139430 A | 6/2009 |
| JP | 2011196916 A | 10/2011 |
| JP | 2014-052274 A | 3/2014 |
| WO | 2016203991 A1 | 12/2016 |

OTHER PUBLICATIONS

Extended European Search Report dated Nov. 22, 2021 from counterpart EP Patent Application No. 19776088.7, 9 pages.
Office action dated Oct. 5, 2021 from counterpart JP Patent Application No. 2020-510771, 2 pages.
International Search Report for related International Application No. PCT/JP2019/011642, dated Jun. 18, 2019; 2 pages.

* cited by examiner

CONTROL DEVICE, IRRADIATION DEVICE, CONTROL METHOD, AND COMPUTER PROGRAM

CROSS-REFERENCE TO RELATED APPLICATIONS

This application is a U.S. National Stage entry of PCT Application No. PCT/JP2019/011642, filed on Mar. 20, 2019, which claims priority to JP Application No. 2018-059344, filed Mar. 27, 2018. The contents of the foregoing are incorporated by reference.

TECHNICAL FIELD

The present invention relates to a control device, an irradiation device, a control method, and a computer program.

BACKGROUND ART

When performing measurement or the like by using a plurality of electromagnetic waves, a plurality of mechanisms for changing the irradiation directions of the electromagnetic waves may be used in combination. In this case, it is necessary to control the movements of the plurality of mechanisms to have desired relationships and synchronisms, in order to efficiently merge and parallelize measurement results by a plurality of electromagnetic waves.

Patent Document 1 describes synchronizing the reflective surfaces of the scanning mirrors of a plurality of optical scanning units to simultaneously scan a laser light over a recording medium. In Patent Document 1, motors driven by all the optical scanning units are rotated at a constant rotation speed.

RELATED DOCUMENT

Patent Document

[Patent Document 1] Japanese Unexamined Patent Publication No. 2001-027737

SUMMARY OF THE INVENTION

Technical Problem

However, since the method of Patent Document 1 is required to rotate all the optical scanning units at the same number of rotations, the method cannot be applied to the case where the rotation speed and the operating frequency are determined depending on the structure of each mechanism.

An example of the problems to be solved by the present invention is to operate a plurality of mechanisms which change the irradiation directions of electromagnetic waves under conditions close to each other.

Solution to Problem

The invention according to claim 1 is a control device including:
a control unit which controls a plurality of irradiation devices that emit electromagnetic waves,
in which the control unit outputs a plurality of first periodic signals for respectively controlling movements of irradiation directions of the electromagnetic waves to a first direction in the plurality of irradiation devices, and a plurality of second periodic signals for respectively controlling movements of the irradiation directions of the electromagnetic waves in the plurality of irradiation devices to a second direction,
in which periods of the plurality of first periodic signals are the same as each other,
in which the control unit outputs the second periodic signals for a plurality of periods during outputting the first periodic signals for one period,
in which effective repetition numbers of movement of the irradiation directions to the second direction while the irradiation directions are moved one period to the first direction are the same for the plurality of irradiation devices, and
in which a difference in the effective repetition numbers of the second periodic signals before a reference point in each period of the first periodic signal is less than 1 between the plurality of irradiation devices.

The invention according to claim 7 is an irradiation device including:
a plurality of irradiation units which emit electromagnetic waves; and
a control unit which controls the plurality of irradiation units,
in which the control unit controls outputs a plurality of first periodic signals for respectively controlling movements of the irradiation directions of the electromagnetic waves from the plurality of irradiation units to a first direction, and a plurality of second periodic signals for respectively controlling movements of the irradiation directions of the electromagnetic waves to a second direction in the plurality of irradiation units,
in which periods of the plurality of first periodic signals are the same as each other,
in which the control unit outputs the second periodic signals for a plurality of periods during outputting the first periodic signals for one period,
in which the effective repetition number of the movement of the irradiation direction to the second direction while the irradiation direction is moved one period to the first direction is the same for the plurality of irradiation units, and
in which a difference in the effective repetition numbers of the second periodic signals before a reference point in each period of the first periodic signal is less than 1 between the plurality of irradiation units.

The invention according to claim 8 is a control method including:
a control step of controlling a plurality of irradiation devices that emit electromagnetic waves,
in which in the control step, a plurality of first periodic signals for respectively controlling movements of irradiation directions of the electromagnetic waves to a first direction in the plurality of irradiation devices, and a plurality of second periodic signals for respectively controlling movements of the irradiation directions of the electromagnetic waves to a second direction in the plurality of irradiation devices are output,
in which periods of the plurality of first periodic signals are the same as each other,
in which in the control step, the second periodic signals for a plurality of periods are output during the first periodic signals for one period are output,
in which effective repetition numbers of movement of the irradiation directions to the second direction while the irradiation directions are moved one period to the first direction are the same for the plurality of irradiation devices, and in which a difference in the effective repetition numbers of the second periodic signals before a reference point in each period of the first periodic signal is less than 1 between the plurality of irradiation devices.

The invention according to claim 9 is a computer program for causing a computer to function as a control unit which controls a plurality of irradiation devices that emit electromagnetic waves, in which the control unit outputs a plurality of first periodic signals for respectively controlling movements of irradiation directions of the electromagnetic waves to a first direction in the plurality of irradiation devices, and a plurality of second periodic signals for respectively controlling movements of the irradiation directions of the electromagnetic waves to a second direction in the plurality of irradiation devices, in which periods of the plurality of first periodic signals are the same as each other, in which the control unit outputs the second periodic signals for a plurality of periods during outputting the first periodic signals for one period, in which effective repetition numbers of movement of the irradiation directions to the second direction while the irradiation directions are moved one period to the first direction are the same for the plurality of irradiation devices, and in which a difference in the effective repetition numbers of the second periodic signals before a reference point in each period of the first periodic signal is less than 1 between the plurality of irradiation devices.

BRIEF DESCRIPTION OF THE DRAWINGS

The foregoing and other objects, features and advantages will become more apparent from the following description of preferred embodiments and the accompanying drawings.

DESCRIPTION OF EMBODIMENTS

Hereinafter, embodiments of the present invention will be described with reference to the drawings. In all the drawings, the same constituents will be referred to with the same numerals, and the description thereof will not be repeated. Further, in each block diagram, each block represents a functional unit configuration, not a hardware unit configuration, unless otherwise specified.

Figure 1:
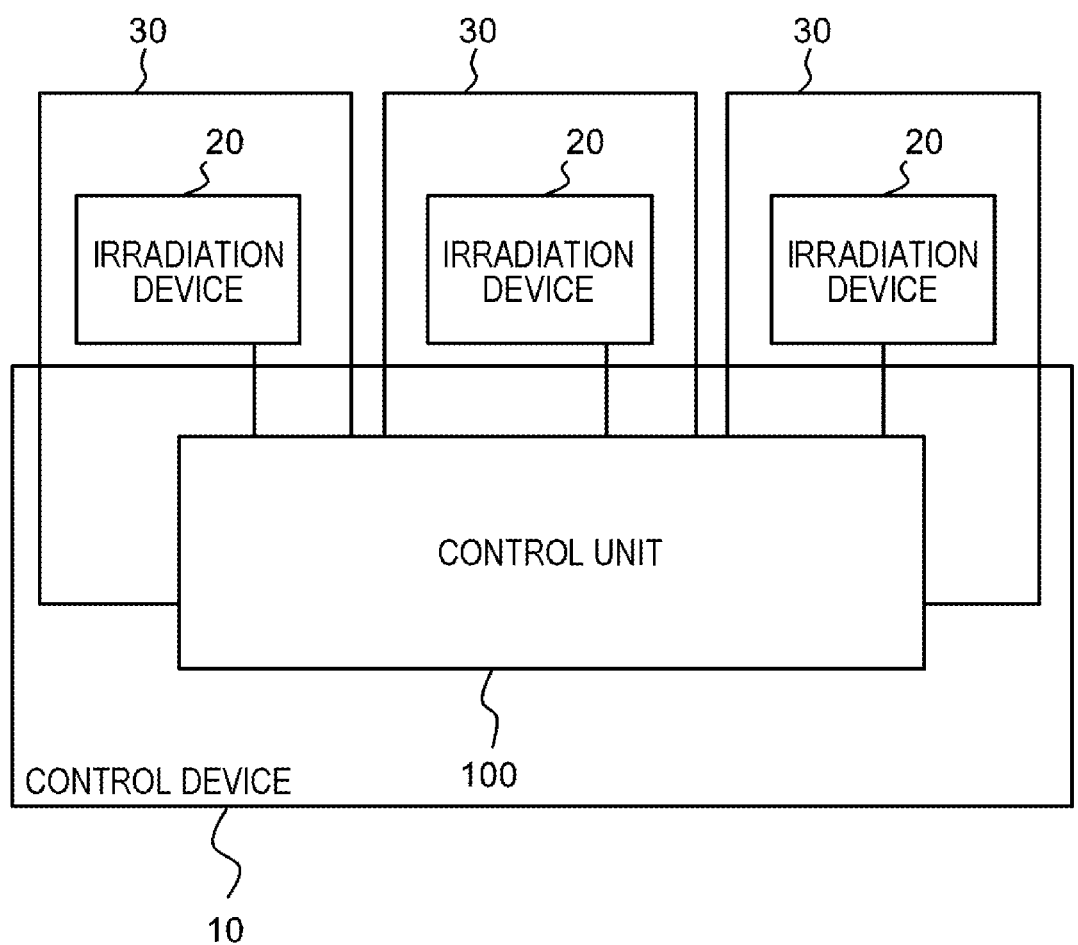
FIG. 1 is a block diagram illustrating a functional configuration of a control device according to an embodiment.

FIG. 1 is a block diagram illustrating a functional configuration of a control device 10 according to the embodiment. The control device 10 includes a control unit 100. The control unit 100 controls the plurality of irradiation devices 20 that emit electromagnetic waves. The control unit 100 outputs a plurality of first periodic signals for respectively controlling movements of the irradiation directions of the electromagnetic waves to a first direction in the plurality of irradiation devices 20, and a plurality of second periodic signals for respectively controlling movements of the irradiation directions of the electromagnetic waves to a second direction in the plurality of irradiation devices 20. The periods of the plurality of first periodic signals are the same as each other. The control unit 100 outputs the second periodic signals for a plurality of periods during outputting the first periodic signal for one period. An effective repetition number of the movement of the irradiation direction to the second direction while the irradiation direction is moved one period to the first direction is the same for the plurality of irradiation devices 20. Then, a difference in the effective repetition numbers of the second periodic signals before a reference point in each period of the first periodic signal is less than 1 between the plurality of irradiation devices. This will be described in detail below.

Each irradiation device 20 constitutes, for example, a measurement device 30 that performs measurement with electromagnetic waves. The measurement device 30 is, for example, a Laser Imaging Detection and Ranging or Laser Illuminated Detection and Ranging (LIDAR) or Light Detection and Ranging (LiDAR). When the irradiation device 20 constitutes a LIDAR, the irradiation device 20 outputs a pulsed electromagnetic wave, and receives the reflected wave reflected by the object. Then, the distance from the measurement device 30 to the object is calculated using the difference between the output timing of the pulse and the reception timing of the reflected wave. The electromagnetic waves are light such as ultraviolet rays, visible rays, and near infrared rays. However, the irradiation device 20 is not limited to what constitutes the measurement device 30.

In the control device 10, the irradiation directions of the electromagnetic waves are changed under the control of the control unit 100. Then, pulse waves are sequentially output in a plurality of irradiation directions, and measurement is performed for each irradiation direction. For example, a plurality of measurement devices 30 are mounted on a moving body such as a vehicle. In order to efficiently measure and process the surrounding environment of the moving body, it is desirable for the plurality of measurement devices 30 to measure ranges close to each other at times close to each other.

Figure 2:
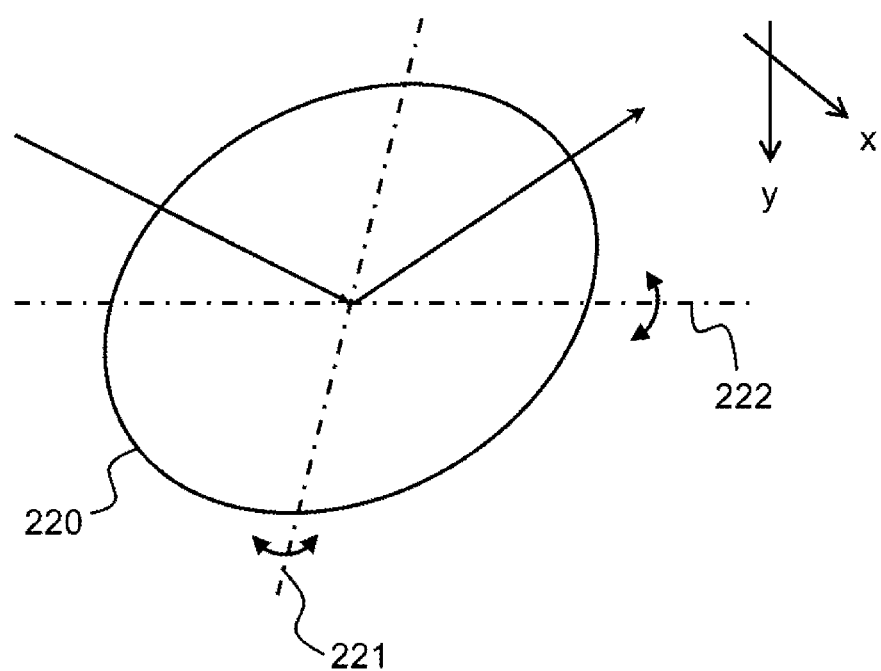
FIG. 2 is a diagram illustrating a structure of a movable reflecting unit that changes an irradiation direction of an electromagnetic wave in an irradiation device.

FIG. 2 is a diagram illustrating the structure of the movable reflecting unit 220 that changes the irradiation direction of the electromagnetic waves, in the irradiation device 20. The movable reflecting unit 220 has a reflecting surface that reflects electromagnetic waves. The electromagnetic wave output from the irradiation element included in the irradiation device 20 is incident and reflected on the reflecting surface. The angle of the reflecting surface of the movable reflecting unit 220 is variable with respect to the first axis 221 and the second axis 222. Then, by changing the angle of the reflecting surface of the movable reflecting unit 220, the irradiation direction of the reflected electromagnetic wave changes. In the example of this figure, specifically, the reflecting surface of the movable reflecting unit 220 swings with respect to the first axis 221, so that the irradiation direction of the electromagnetic wave reciprocates in the first direction. In addition, the reflecting surface of the movable reflecting unit 220 swings with respect to the second axis 222, so that the irradiation direction of the electromagnetic wave reciprocates in the second direction. Hereinafter, in each drawing, the first direction is illustrated as the y direction and the second direction is illustrated as the x direction. The movement of the irradiation direction of the electromagnetic wave in a certain direction means that the spot of the electromagnetic wave moves in a certain direction.

In the present embodiment, the first periodic signal is a signal for controlling the drive of the movable reflecting unit 220 with respect to the first axis 221. Then, the value of the first periodic signal corresponds to the rotation angle of the reflecting surface of the movable reflecting unit 220 about the first axis 221. As a result, the position of the y direction of the irradiation direction of the electromagnetic wave substantially corresponds to the value of the first periodic signal. The periods of the first periodic signals for the plurality of irradiation devices 20 may be the same as each other.

The movable reflecting unit 220 is, for example, a MEMS mirror. The drive frequency of the movable reflecting unit 220 with respect to at least one axis is, for example, a resonance frequency depending on the structure of the movable reflecting unit 220. In the present embodiment, the driving frequency of the movable reflecting unit 220 with respect to the second axis 222 is the resonance frequency. The second periodic signal is a signal for controlling the drive of the movable reflecting unit 220 with respect to the second axis 222. The period of the second periodic signal corresponds to the period of swinging of the reflecting surface of the movable reflecting unit 220 about the second axis 222. As a result, the irradiation direction of the electromagnetic wave reciprocates in the x direction in the period of the second periodic signal.

By setting the drive frequency of at least one axis of the movable reflecting unit 220 as the resonance frequency of the drive, high-speed drive with a large amplitude can be realized. On the other hand, the resonance frequencies of the movable reflecting units 220 in the plurality of irradiation devices 20 may differ from each other due to slight differences in structure and mechanical characteristics. Therefore, it is difficult to make the drive frequencies due to the resonance of the plurality of irradiation devices 20 exactly the same. As a result, the second periodic signals having different periods are used for the plurality of irradiation devices 20. However, when the resonant frequencies of the movable reflecting units 220 are the same as each other, the second periodic signals having the same period as each other may be used for two or more irradiation devices 20.

Figure 3:
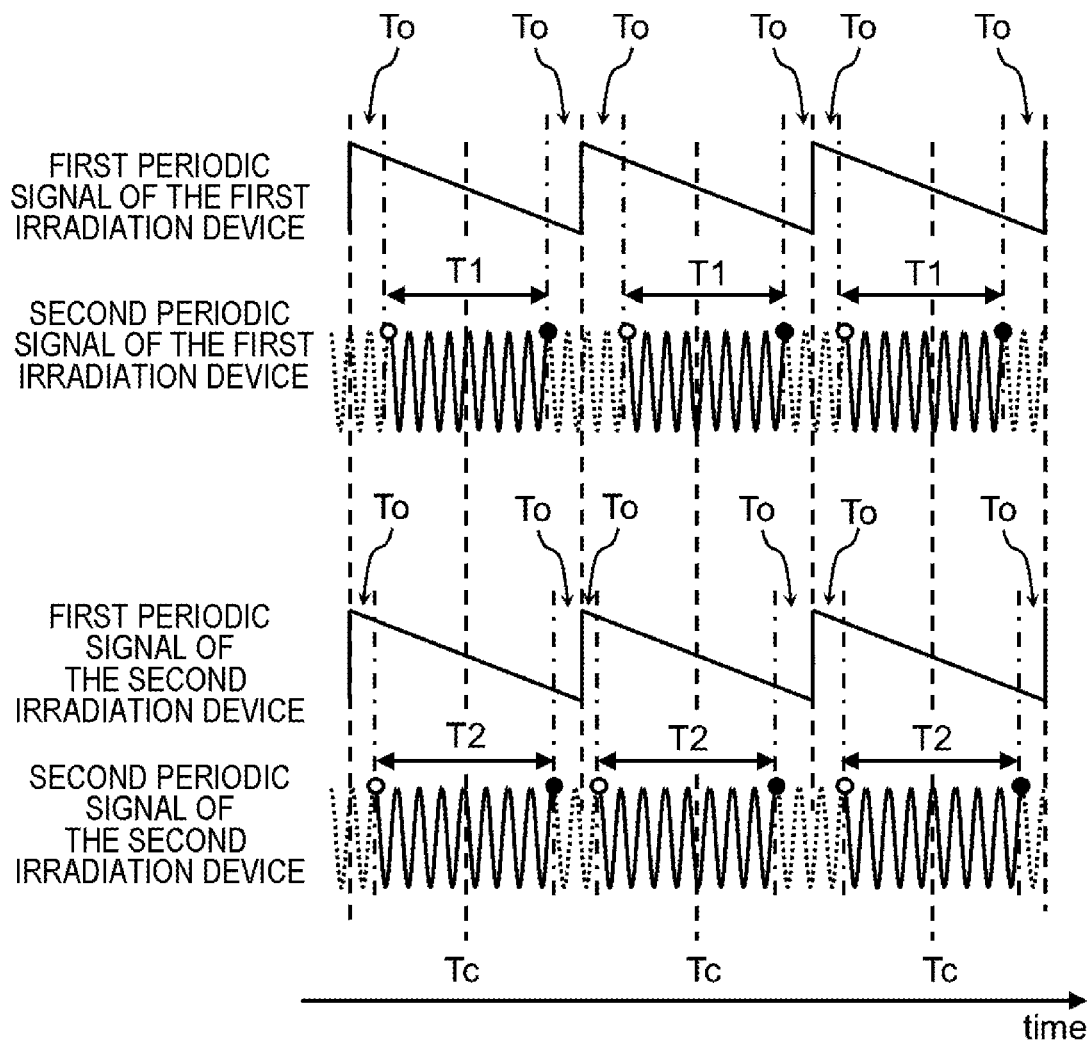
FIG. 3 is a diagram illustrating a relationship between a first periodic signal of a first irradiation device, a second periodic signal of the first irradiation device, a first periodic signal of a second irradiation device, and a second periodic signal of the second irradiation device according to the embodiment.

FIG. 3 is a timing chart illustrating a relationship between a first periodic signal of the first irradiation device 20, a second periodic signal of the first irradiation device 20, a first periodic signal of the second irradiation device 20, and a second periodic signal of the second irradiation device 20 according to the present embodiment. The plurality of irradiation devices 20 include the first irradiation device 20 and the second irradiation device 20. The period of the second periodic signal of the second irradiation device 20 is longer than the period of the second periodic signal of the first irradiation device 20. On the other hand, as described above, the period of the first periodic signal is the same in the first irradiation device 20 and the second irradiation device 20. Note that the number of plurality of irradiation devices 20 may be two, or three or more.

In the example of FIG. 3, the first periodic signal is a sawtooth wave and the second periodic signal is a sine wave. The shapes of the first periodic signal and the second periodic signal are not limited to the example shown in FIG. 3. For example, the first periodic signal may be a sine wave. In that case, the irradiation direction of the electromagnetic wave moves so as to draw a Lissajous curve. The control unit 100 continuously outputs the first periodic signal and the second periodic signal to the irradiation device 20, one pair at a time. In FIG. 3, the second periodic signal inside the movement time counted as the effective repetition number is indicated by a solid line, and the second periodic signal outside the movement time counted as the effective repetition number is indicated by a dotted line. The effective repetition number will be described later in detail.

Figure 4:
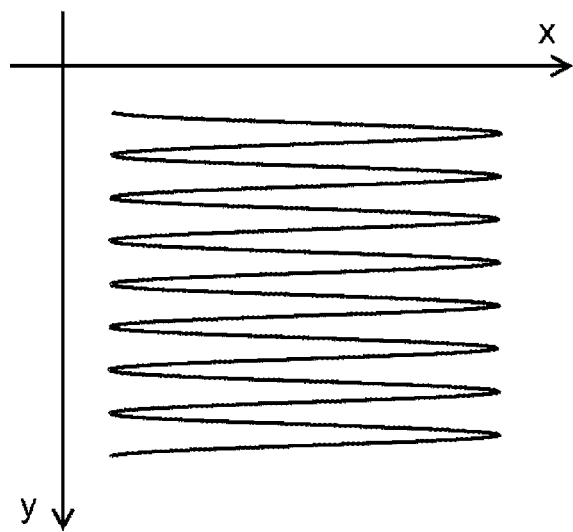
FIG. 4 is a diagram illustrating a change in an irradiation direction of an electromagnetic wave per one period of a first periodic signal in the irradiation device.

FIG. 4 is a diagram illustrating a change in an irradiation direction of an electromagnetic wave per one period of a first periodic signal in the irradiation device 20. A frame is determined by the range of the controlled irradiation direction, and with respect to an area within the frame (hereinafter, referred to as "frame area"), frame data indicating the surrounding situation is generated based on the measurement data of the measurement device 30.

As described above, the control unit 100 outputs the second periodic signal for a plurality of periods during outputting the first periodic signal for one period. Therefore, the irradiation direction of the electromagnetic wave moves back and forth a plurality of periods in the x direction while moving one period in the y direction. As a result, the irradiation direction moves such that one frame area is scanned with a plurality of lines. Then, by outputting the first periodic signal for a plurality of periods, the irradiation direction moves such that the frame area is repeatedly scanned. In the measurement device 30, frame data is generated every time the irradiation direction of the electromagnetic wave is moved so as to scan the frame area once. In the frame data, the distance to the object measured in the frame area is shown in association with the irradiation direction. For example, the frame data is composed of measurement data on a plurality of lines drawn by changing the irradiation direction to the second direction.

When the periods of the second periodic signals of the plurality of irradiation devices 20 are the same, the numbers of periods of the second periodic signals output during one period of the first periodic signal are the same. However, as described above, when the periods of the second periodic signals of the irradiation devices 20 are different from each other, the number of periods of the second periodic signal included in one period of the first periodic signal is different from each other in the plurality of irradiation devices 20, and the longer the period, the smaller the number of periods of the second periodic signal per one period of the first periodic signal. As a result, when processing frame data obtained by a plurality of irradiation devices 20, if the numbers of lines in the frame are different from each other, it is necessary to change the processing condition for each irradiation device 20, and frame data cannot be processed efficiently. Therefore, the number of lines that substantially form the frame is required to be the same in the plurality of irradiation devices 20.

Example of a method for making the number of lines that substantially form a frame the same in the plurality of irradiation devices 20 is a method of increasing the period of the first periodic signal as the irradiation device 20 has a longer period of the second periodic signal. That is, it is conceivable that the time obtained by multiplying the period of the second periodic signal by the number of lines in the frame is used as the period of the first periodic signal. However, in this method, the time taken to acquire one frame of data differs for each irradiation device 20, and the larger the number of frames to be generated, the greater the deviation in the operation timing among the irradiation devices 20.

On the other hand, in the control device 10 according to the present embodiment, the periods of the first periodic signals for the plurality of irradiation devices 20 are the same. Therefore, it is possible to acquire a plurality of frame data at substantially the same timing. In addition, the first periodic signals for the plurality of irradiation devices 20 are synchronized.

Further, according to the control device 10 according to the present embodiment, the effective repetition number of the movement of the irradiation direction to the second direction, while the irradiation direction is moved one period to the first direction, is the same for the plurality of irradiation devices 20. The effective repetition number is the number of repeating units of movement that mainly contributes to the generation of frame data. The effective repetition number is proportional to the number of lines per frame. Therefore, the number of lines included in each frame can be matched with each other for the plurality of irradiation devices 20. The repetition number and repeating unit will be described in detail later.

In each period of the first periodic signal, there may be a time when effective measurement is performed and a time when the effective measurement is not performed. An effective measurement is a measurement in which measurement data used to generate frame data is acquired.

In FIG. 3, the period from the white circle to the black circle indicated in the second periodic signal of the first irradiation device 20 is the movement time T1 counted as the effective repetition number. Further, the period from the white circle to the black circle indicated in the second periodic signal of the second irradiation device 20 is the movement time T2 counted as the effective repetition number. In the example of FIG. 3, in each irradiation device 20, there is a movement time To not counted as the effective repetition number in the second periodic signal in at least one of the vicinity of the beginning and the vicinity of the end of one period of the first periodic signal.

At time To, no effective measurement is performed. Further, there may be a time during which effective measurement is not performed even within the movement time counted as the effective repetition number.

Examples of the operations of the irradiation device 20 and the measurement device 30 during the time when effective measurement is not performed include the following first operation example and second operation example. However, it is not limited to the following example. Further, the operations of the irradiation device 20 and the measurement device 30 during the time when effective measurement is not performed may be different from time to time.

In the first operation example, the electromagnetic wave is not emitted from the irradiation device 20 during the time when effective measurement is not performed. That is, even when the movable reflecting unit 220 of the irradiation device 20 is driven, no electromagnetic wave is output from the irradiation element of the irradiation device 20.

In the second operation example, the irradiation device 20 is included in the measurement device 30 that receives the reflected wave of the electromagnetic wave which is emitted from the irradiation device 20 and is reflected by the object, and performs the measurement. Then, during the time when the effective measurement is not performed, the measurement device 30 does not perform the measurement. That is, even when an electromagnetic wave is emitted from the irradiation device 20 during the time when effective measurement is not performed, the measurement device 30 does not calculate the measurement value based on the reflected wave of the electromagnetic wave. Alternatively, even when the calculation is performed, the measurement value based on the reflected wave of the electromagnetic wave emitted during the time when the effective measurement is not performed is not used for generating the frame data.

On the other hand, at the time when the effective measurement is performed, the electromagnetic wave whose irradiation direction is controlled by the control unit 100 is output from the irradiation device 20. More specifically, pulses are continuously output at predetermined intervals while changing the irradiation direction. Then, a measurement value based on the reflected wave of the electromagnetic wave is calculated and used for generating the frame.

Figure 5A:
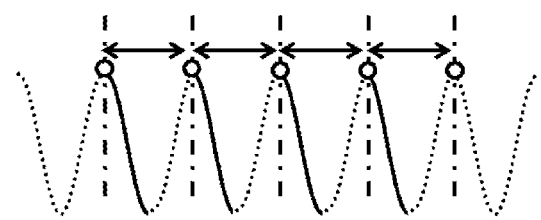
FIG. 5(*a*) to FIG. 5(*c*) are diagrams for explaining a repeating unit of movement.
Figure 5B:
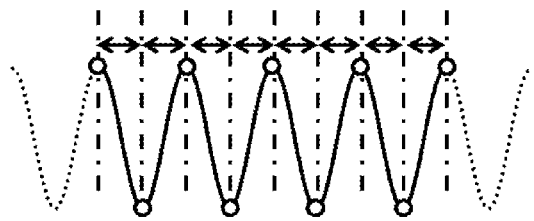
Figure 5C:
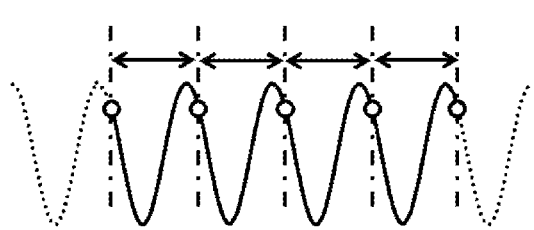

FIG. 5(a) to FIG. 5(c) are diagrams for explaining the repeating unit of movement. In FIG. 5(a) to FIG. 5(c), the time waveform of the second periodic signal is shown by the solid line and the dotted line, and in the portion of the solid line, effective measurement is performed by the measurement device 30. On the other hand, in the portion of the dotted line, the measurement device 30 does not perform effective measurement. In addition, in FIG. 5(a) to FIG. 5(c), the start point and the end point of each repeating unit of the movement to the second direction are indicated by white circles. In FIG. 5(a) to FIG. 5(c), each arrow shows the range of each repeating unit. In addition, the time zone not included in the repeating unit in FIG. 5(a) to FIG. 5(c) is the movement time To which is not counted as the effective repetition number.

In the example of FIG. 5(a), within the movement time counted as the effective repetition number, effective measurement is performed only in a half period of the movement of one period of the second periodic signal in the second direction, and effective measurement is not performed in the remaining half period. Such one period can be called one repeating unit. That is, the repeating unit may include movement within a time period when effective measurement is not performed. One line in the frame data is composed of the measurement data in the half period. In the present example, the repeating unit corresponds to one period of the second periodic signal, that is, a phase of $2\pi$ radians.

In the example of FIG. 5(b), two lines in the frame data are formed by the reciprocating movement for one period in the second direction. Specifically, effective measurement is performed on each of the forward and backward paths. In such a case, the range of the same x-coordinate is repeatedly traced in the opposite directions, and a half period, that is, a phase of $\pi$ radian can be called one repeating unit. That is, the direction of movement may be reversed in successive repeating units. In the present example, the repeating unit does not include the time during which effective measurement is not performed.

In the example of FIG. 5(c), the start point of effective measurement is deviated from the peak of the second periodic signal. Therefore, the start point of the repeating unit is deviated from the peak of the second periodic signal. As described above, the phase state of the second periodic signal at the start point of the repeating unit is not particularly limited. Moreover, the phase state of the second periodic signal at the start point of the repeating unit may be different for each period of the first periodic signal. Further, the phase state of the second periodic signal at the start point of the repeating unit may be different among the plurality of irradiation devices 20. In the present example, the repeating unit matches to one period of the second periodic signal, that is, a phase of $2\pi$ radians. The range corresponding to the amplitude of the second periodic signal is scanned thoroughly by effective measurement of the second periodic signal for one period.

The examples of the second periodic signal and the repeating unit are not limited to the examples shown in FIG. 5(a) and FIG. 5(b). For example, the time during which effective measurement is performed in one repeating unit may be shorter than $\pi$ radian. Further, the time during which effective measurement is performed in one repeating unit may be divided into a plurality of times. However, in each period of the first periodic signal, that is, in the acquisition of each frame data, the repeating unit occurs continuously.

The repeating unit is the smallest repeating unit that can be defined under the above conditions in each period of the first periodic signal. The length of the repeating unit is not particularly limited, but is, for example, $\pi$ radian or more and $2\pi$ radian or less in the phase of the second periodic signal. The effective repetition number is the number of continuous repeating units, and the effective repetition number is an integer in each period of the first periodic signal. In each period of the first periodic signal, the start point (white circle in FIG. 3) of the movement time counted as the effective repetition number of the second periodic signal is the first irradiation timing for obtaining the measurement data of the frame data generated in that period. Further, in each period of the first periodic signal, the end point (black circle in FIG. 3) of the movement time counted as the effective repetition number of the second periodic signal is the end point of the repeating unit including the last irradiation timing for obtaining the measurement data of the frame data generated in that period.

Further, according to the control device 10 according to the present embodiment, a difference in the effective repetition numbers of the second periodic signals before a reference point in each period of the first periodic signal is less than 1 among the plurality of irradiation devices. Therefore, the plurality of irradiation devices 20 can start and end scanning of one frame area at timings close to each other. Then, the plurality of measurement devices 30 can generate frame data at timings close to each other. In addition, the effective repetition number of the second periodic signal, before a reference point, in each period of the first periodic signal is not limited to an integer.

In measurement using a plurality of irradiation devices 20, frame data is generated at a timing close to all irradiation device 20, so that all frame data can be processed in parallel. Specifically, for example, when a plurality of measurement devices 30 are mounted on a moving body and each measurement device 30 is attached in a different direction, data indicating the surrounding state of the moving body at a certain time can be generated by merging the measurement results from the plurality of measurement devices 30. Further, in the case where automatic driving or the like based on the measurement results of the plurality of measurement devices 30 is performed for driving the moving body, it is not necessary to change the timing of a process required for the automatic driving for each measurement device 30. The subsequent process using the generated frame data may be started after the end of the period of generating the frame data of the first periodic signal, or before the end thereof. For example, the subsequent process may be performed as soon as the frame data is generated.

In the present embodiment, the period of the first periodic signal may not be an integer multiple of the period of the second periodic signal of each irradiation device 20. In this case, the phase of the second periodic signal of each irradiation device 20 at the reference point of a certain period of the first periodic signal is different from the phase at the reference point of the next period of the first periodic signal. The reference point of the first periodic signal is not particularly limited, but is, for example, a time point at which one repeating unit or more has elapsed from the start point of the first periodic signal, for example, from the time point at which the maximum value is obtained, and the time point is, for example, the center point of time of each period of the first periodic signal.

A relationship between a first periodic signal of the first irradiation device, a second periodic signal of the first irradiation device, a first periodic signal of the second irradiation device, a second periodic signal of the second irradiation device, and the processing contents of the control unit 100 will be described in more detail in each example described later.

Figure 6:
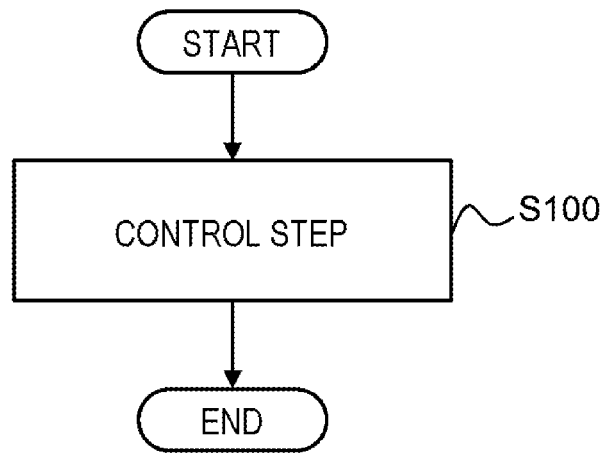
FIG. 6 is a flowchart illustrating a control method according to the embodiment.

FIG. 6 is a flowchart illustrating a control method according to the embodiment. The present method includes a control step S100 of controlling a plurality of irradiation devices 20 that emit electromagnetic waves. In the control step S100, a plurality of first periodic signals for respectively controlling movements of the irradiation directions of the electromagnetic waves to a first direction in the plurality of irradiation devices 20 and a plurality of second periodic signals for respectively controlling movements of the irradiation directions of the electromagnetic waves to a second direction in the plurality of irradiation devices 20 are output. The periods of the plurality of first periodic signals are the same as each other. In the control step S100, the second periodic signal is output for a plurality of periods during the first periodic signal for one period is output. The effective repetition number of the movement of the irradiation direction to the second direction, while the irradiation direction is moved one period to the first direction, is the same for the plurality of irradiation devices. Then, a difference in the effective repetition numbers of the second periodic signals before a reference point in each period of the first periodic signal is less than 1 among the plurality of irradiation devices.

The control method according to the present embodiment is realized by the control device 10 as described above.

As described above, according to the present embodiment, a difference in the effective repetition numbers of the second periodic signals before a reference point in each period of the first periodic signal is less than 1 among the plurality of irradiation devices. Therefore, by changing the irradiation direction such that the plurality of irradiation devices 20 scan one area at timings close to each other, the plurality of irradiation devices 20 can be operated under conditions close to each other.

Example 1

Figure 7:
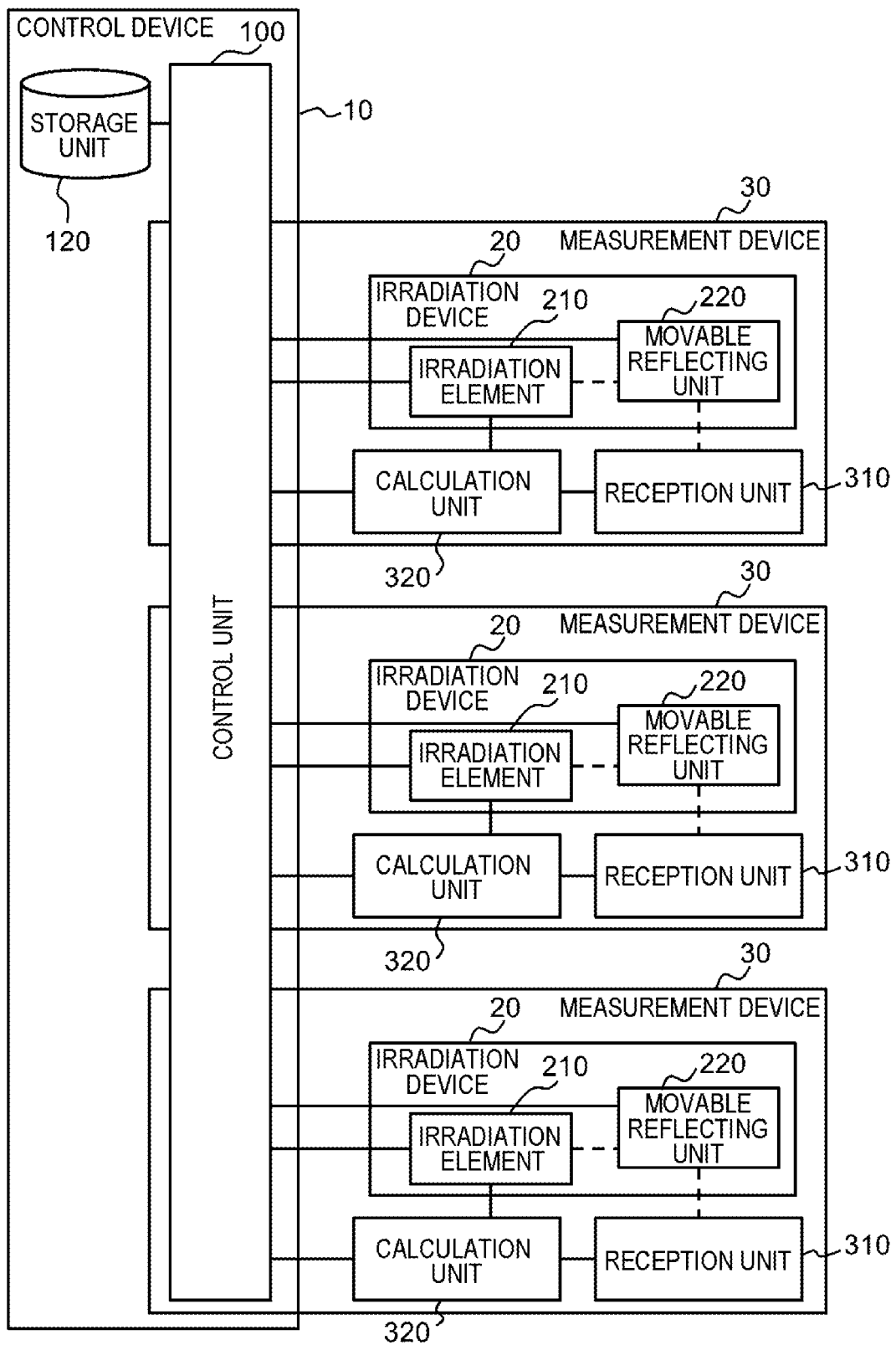
FIG. 7 is a block diagram illustrating a functional configuration of a control device according to Example 1.

FIG. 7 is a block diagram illustrating the functional configuration of a control device 10 according to Example 1. In FIG. 7, the electrical connection relationship is indicated by a solid line, and the electromagnetic wave relationship is indicated by a broken line. The control device 10 according to Example 1 has the same configuration as the control device 10 according to the embodiment. The usage environment and operation of the control device 10 will be described in detail below.

Figure 8:
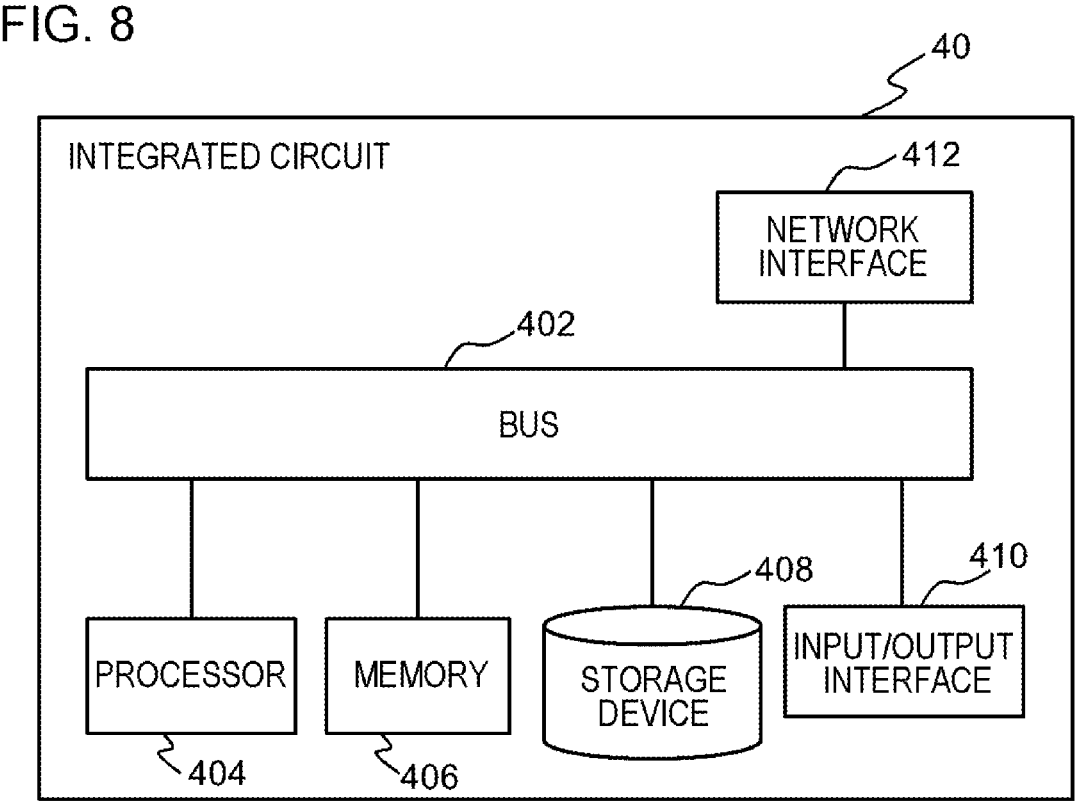
FIG. 8 is a diagram illustrating a hardware configuration of the control device.

The control device 10 is a device that controls the plurality of irradiation devices 20. The control device 10 includes a control unit 100, and the control unit 100 outputs a control signal for controlling the irradiation device 20. The irradiation device 20 includes an irradiation element 210 and a movable reflecting unit 220. The irradiation element 210 is, for example, a laser diode. As described in the embodiment, the movable reflecting unit 220 reflects the electromagnetic wave output from the irradiation element 210. The movable reflecting unit 220 is configured such that the irradiation direction of the electromagnetic wave can be changed to the biaxial direction. The irradiation direction of the electromagnetic wave from the irradiation device 20 is controlled by the control device 10 controlling the angle of the reflecting surface of the movable reflecting unit 220. A drive circuit for the irradiation element 210 may be further interposed between the control unit 100 and the irradiation element 210. The measurement device 30 includes an irradiation device 20, a reception unit 310, and a calculation unit 320. The reception unit 310 receives the reflected wave which is output from the irradiation device 20 and reflected by the object outside the measurement device 30. The reception unit 310 is, for example, a photodiode. The calculation unit 320 calculates the distance from the measurement device 30 to the object, based on the output timing of the pulsed electromagnetic wave from the irradiation element 210 and the reception timing of the reflected wave by the reception unit 310. The calculation unit 320 is realized by, for example, an integrated circuit as illustrated in FIG. 8 described later.

Apart of the control unit 100 may be included in the measurement device 30. That is, the function of the control unit 100 may be realized by the cooperation of the integrated circuit outside the measurement device 30 and the integrated circuit inside the measurement device 30. For example, the first periodic signal may be output from an integrated circuit outside the measurement device 30, and the second periodic signal may be output from an integrated circuit inside each measurement device 30. In this case, the first periodic signal from the integrated circuit outside the measurement device 30 is input to the integrated circuit inside the measurement device 30, and the integrated circuit inside the measurement device 30 may output a control signal to the movable reflecting unit 220 and the irradiation element 213.

Further, the control unit 100 may be realized by cooperation of integrated circuits inside the plurality of measurement devices 30. In that case, for example, an integrated circuit provided in the position measurement device 30 may output the common first periodic signal to the other measurement devices 30.

Further, the control unit 100 may be configured only by an integrated circuit outside the measurement device 30.

Although FIG. 7 illustrates an example in which each of the plurality of irradiation devices 20 is included in different measurement device 30, the present invention is not limited to the present example. The plurality of irradiation devices 20 may be included in one measurement device 30.

A first periodic signal of the first irradiation device, a second periodic signal of the first irradiation device, a first periodic signal of the second irradiation device, and a second periodic signal of the second irradiation device according to the present example are Illustrated in FIG. 3. Referring to FIG. 3, a relationship between the first periodic signal of the first irradiation device, the second periodic signal of the first irradiation device, the first periodic signal of the second irradiation device, and the second periodic signal of the second irradiation device will be described in detail.

The first periodic signal is a signal for controlling the movement of irradiation direction of the electromagnetic wave to the first direction in the irradiation device 20. The period of the first periodic signal is the same for the plurality of irradiation devices 20. The amplitude of the first periodic signal may be the same for the plurality of irradiation devices 20, or may be different from each other. For each period of the first periodic signal, the irradiation direction moves back and forth once in the first direction, and the measurement device 30 generates one frame data. In the following description, for convenience, the timing at which the first periodic signal has the maximum value is referred to as the "start point" and "end point" of each period of the first periodic signal. However, the start point and the end point of the period of the first periodic signal are not particularly limited.

The second periodic signal is a signal for controlling the movement of irradiation direction of the electromagnetic wave to the second direction in the irradiation device 20. The period of the second periodic signal is not the same for the plurality of irradiation devices 20. That is, the plurality of second periodic signals for the plurality of irradiation devices 20 include two or more second periodic signals having different periods. The amplitudes of the plurality of second periodic signals are not particularly limited, and may be the same as each other or different from each other. In the following description, for convenience, the timing at which the second periodic signal has the maximum value is referred to as the "start point" and "end point" of each period of the second periodic signal. However, the start point and end point of the period of the second periodic signal are not particularly limited.

FIG. 8 is a diagram illustrating a hardware configuration of the control device 10. In FIG. 8, the control device 10 is mounted using an integrated circuit 40. The integrated circuit 40 is, for example, a System On Chip (SoC).

The integrated circuit 40 has a bus 402, a processor 404, a memory 406, a storage device 408, an input/output interface 410, and a network interface 412. The bus 402 is a data transmission path through which the processor 404, the memory 406, the storage device 408, the input/output interface 910, and the network interface 412 mutually transmit and receive data. However, a method of connecting the processors 404 and the like to each other is not limited to bus connection. The processor 409 is an arithmetic processing unit realized by using a microprocessor or the like. The memory 906 is a memory realized by using a Random Access Memory (RAM) or the like. The storage device 408 is a storage device realized by using a Read Only Memory (ROM), a flash memory, or the like.

The input/output interface 410 is an interface for connecting the integrated circuit 40 to peripheral devices. The input/output interface 910 is connected to, for example, the movable reflecting units 220 of the plurality of irradiation devices 20. When the plurality of irradiation devices 20 use the first periodic signals having the same amplitude, only one first periodic signal may be output from the integrated circuit 40, and the signal may be branched outside the integrated circuit 40 and input to each irradiation device 20.

The network interface 412 is an interface for connecting the integrated circuit 90 to a communication network. This communication network is, for example, a Controller Area Network (CAN) communication network. Note that, the method by which the network interface 412 connects to the communication network may be a wireless connection or a wired connection.

The storage device 408 stores program modules for realizing the functions of the control unit 100. The processor 404 realizes the function of the control unit 100 by reading this program module into the memory 406 and executing it.

The hardware configuration of the integrated circuit 40 is not limited to the configuration illustrated in FIG. 8. For example, the program module may be stored in the memory 406. In this case, the integrated circuit 40 may not include the storage device 408.

Referring to FIG. 3, a relationship between a first periodic signal of the first irradiation device 20, a second periodic signal of the first irradiation device 20, a first periodic signal of the second irradiation device 20, and a second periodic signal of the second irradiation device 20 will be described in detail.

In the present example, the movement time counted as the effective repetition number is determined based on the reference point of the first periodic signal. Specifically, as described above, a difference in the effective repetition number of the second periodic signal before the reference point in each period of the first periodic signal is less than 1 between the plurality of irradiation devices, so the movement times (timings) counted as the numbers of effective repetitions of the second periodic signals of the plurality of irradiation devices 20 are close to each other. The reference point is the same in all periods of the first periodic signal. The reference point is the same in the first periodic signals of all the irradiation devices 20.

Further, in the example of FIG. 3, in each period of the first periodic signal, the magnitude |N1−N2| of the difference between the effective repetition number N1 before the reference point and the effective repetition number N2 after the reference point of each period of the first periodic signal is set to be substantially equal to the predetermined setting value S in all of the plurality of irradiation devices 20. Specifically, for example, S−1≤(N1−N2)≤S+1 holds for all of the plurality of irradiation devices 20.

FIG. 3 illustrates an example in which the reference point is the center Tc of each period of the first periodic signal and S=0. That is, in each period of the first periodic signal, the magnitude of the difference between the effective repetition number N1 before the center Tc and the effective repetition number N2 after the center Tc of each period of the first periodic signal is 1 or less in all of the plurality of irradiation devices 20. As a result, the movement time counted as the effective repetition number of the second periodic signals of the plurality of irradiation devices 20 is closer to the center Tc of each period of the first periodic signal.

The reference point is not limited to the center and may be a point in the first half of the period or a point in the second half of the period.

Figure 9:
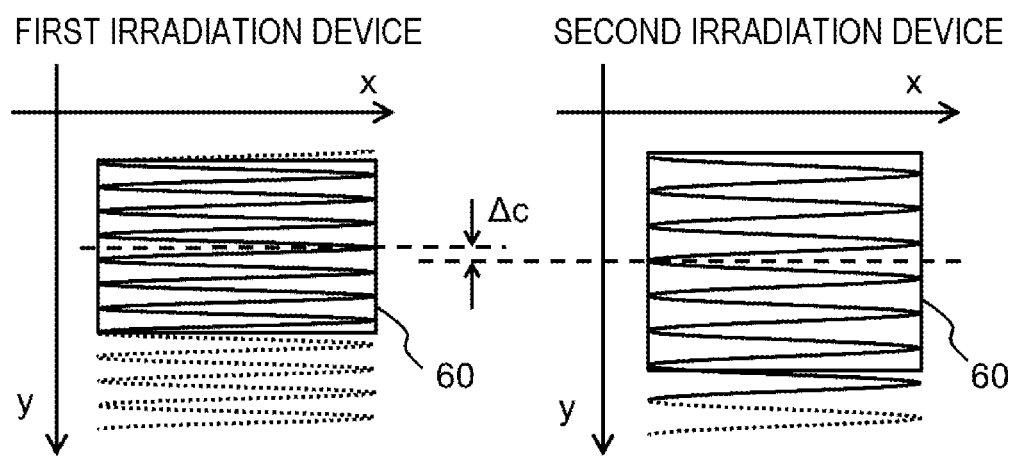
FIG. 9 is a diagram illustrating a frame area based on signals illustrated in FIG. 13.
Figure 10:
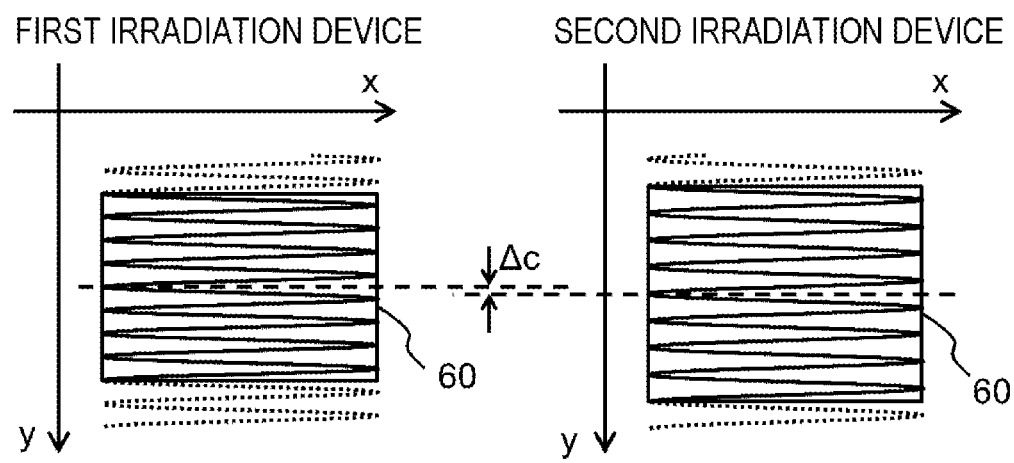
FIG. 10 is a diagram illustrating a frame area based on signals illustrated in FIG. 3.

FIG. 9 is a diagram illustrating a frame area 60 based on the signals illustrated in FIG. 13 described in Example 3 later. In the signals illustrated in FIG. 13, the portion counted as the effective repetition number is biased to the first half of the first periodic signal. In addition, FIG. 10 is a diagram illustrating a frame area 60 based on the signals illustrated in FIG. 3. FIGS. 9 and 10 each illustrate changes in the irradiation direction during one period of the first periodic signal, the left side of each figure is the frame area 60 of the first irradiation device 20, and the right side is the frame area of the second irradiation device 20. Further, in FIGS. 9 and 10, a portion which can be counted as the effective repetition number is indicated by a solid line and a portion which cannot be counted as the effective repetition number is indicated by a dotted line. The frame area 60 is the range scanned by the movement counted as the number of execution repetitions.

In the example of FIG. 9, the frame area 60 is located closer to the upper side in FIG. 9, whereas in the example of FIG. 10, the frame area 60 is located closer to the center in FIG. 10. As a result, a deviation width Δc in the y direction between the center of the frame area 60 of the first irradiation device 20 and the center of the frame area 60 of the second irradiation device 20 is smaller in the example of FIG. 10 than in the example of FIG. 9.

In the signals illustrated in FIG. 3, the movement time counted as the effective repetition number is determined based on the reference point of the first periodic signal, so that the frame areas 60 of the plurality of irradiation devices 20 can be moved close to each other in the y direction. Further, the times at which the respective frame areas 60 are scanned can be made closer to each other in the plurality of irradiation devices 20. As a result, it is possible to suppress variations in the processing timing of the frame data, and to suppress the time required for processing and the cost of the memory and the like. Further, the measurement data at substantially the same time can be obtained by the plurality of irradiation devices 20.

Returning to FIG. 3, in 10 according to the present example, in all of the plurality of irradiation devices 20, there is a movement time To not counted as the effective repetition number in the second periodic signal in both the vicinity of the beginning and the vicinity of the end of one period of the first periodic signal.

In the present embodiment, in the first irradiation device 20 and the second irradiation device 20, for example, the time To is present in at least one of the beginning and the end of the time $T_{act\_real}$ defined as follows. Here, the time To is a time during which effective measurement is not performed in the time $T_{act\_real}$.

Figure 11:
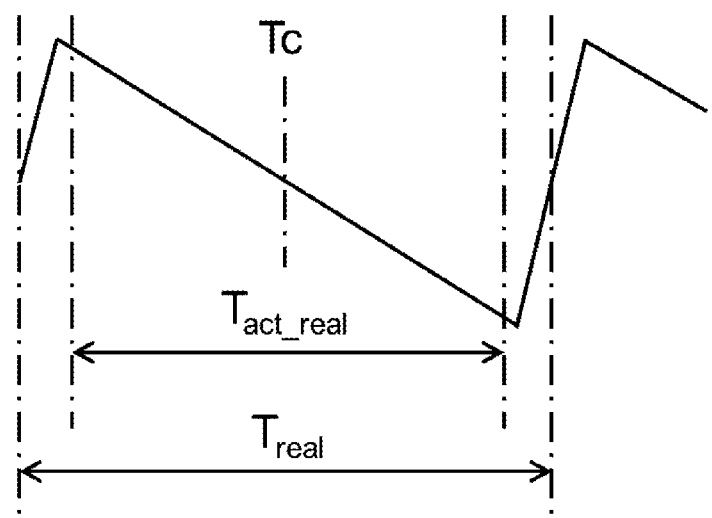
FIG. 11 is a diagram for explaining time $T_{act\_real}$.

FIG. 11 is a diagram for explaining the time $T_{act\_real}$. When the first periodic signal is a sawtooth wave as in FIG. 11, time $T_{act\_real}$ is a period included in each period $T_{real}$ of the sawtooth wave. Then, the time $T_{act\_real}$ is a period in which the driving result of the irradiation direction of the electromagnetic wave to the first direction by the first periodic signal keeps linear. Specifically, the start point of the time $T_{act\_real}$ is a point that is slightly overshooting the first vertex of each period of the first periodic signal, and the end point is slightly before the vertex of the next period of the first periodic signal. Around the vertex of the sawtooth wave, the driving result in the irradiation direction is disturbed, while the time $T_{act\_real}$ is a period during which good scanning can be performed. In each period of the first periodic signal, effective measurement is not performed at a time outside the time $T_{act\_real}$. The time center of the period $T_{real}$ and the time center of the time $T_{act\_real}$ coincide with each other. In each drawing, the shape of the first periodic signal is simplified and drawn such that the entire period is the time $T_{act\_real}$.

In FIG. 3, with respect to the movement time T1 counted as the effective repetition number of the first irradiation device 20, the start point is indicated by a white circle and the end point is indicated by a black circle. The same applies to the movement time T2 counted as the effective repetition number of the second irradiation device 20. In the following description, the time T1 is taken as an example, but the same applies to the movement time counted as the effective repetition number of each irradiation device 20. In the present example, the start point and the end point of the time T1 in each period of the first periodic signal are determined such that the effective repetition number before and after the reference point is close to a predetermined number. Examples of the method of determining the time T1 include the following first example and second example. However, the method of determining the time T1 is not limited to these examples.

In the first example of the method of determining the time T1, the start point and the end point of the time T1 are made to coincide with the start point and the end point of either period of each second periodic signal. Specifically, for example, the storage unit 120 provided in advance in the control device 10 stores reference information indicating the relationship between the phase of the second periodic signal at the start point of each period of the first periodic signal and the timings of the start point and the end point of time T1. Then, the control unit 100 can read the reference information from the storage unit 120 and use it for determining the start point and the end point of the time T1. The relationship between the phase of the second periodic signal at the start point of each period of the first periodic signal and the timings of the start point and the end point of the movement time counted as the effective repetition number can be calculated in advance based on the period of the first periodic signal, the period of the second periodic signal, the effective repetition number, and the reference point. The effective repetition number is preset in the control device 10 by, for example, user input or the like. The storage unit 120 may be separately present inside the measurement device 30.

In the second example of the method of determining the time T1, the start point and the end point of the time T1 do not always match the start point and the end point of any period of the second periodic signal. Specifically, the timings of the start point and the end point of time T1 are predetermined in each period of the first periodic signal. The timing of the start point and the end point of the time T1 is determined based on the time corresponding to a predetermined effective repetition number before and after the reference point, for example. Each timing can be calculated in advance based on the effective repetition number before the reference point, the effective repetition number after the reference point, the time per repeating unit, and the reference point.

For example, the control unit 100 determines the time T1 and the time T2 as described above for each period of the first periodic signal. Then, the control unit 100 may further output a timing signal indicating the start points and the end points of the time T1 and the time T2, and the irradiation device 20 and the measurement device 30 may be input the timing signal. In that case, in the irradiation device 20 and the measurement device 30, the presence or absence of irradiation of electromagnetic waves or the generation of frame data is controlled based on the timing signal.

In the present example, the frame area 60 of each irradiation device 20 fluctuates in the y direction for each frame. The width of the fluctuation corresponds to one repeating unit. The specific width of fluctuation is a magnitude obtained by multiplying the amount of movement per unit time in the first direction by the time per repeating unit. That is, when the amplitude of the first periodic signal is the same for the plurality of irradiation devices 20, the fluctuation width increases as the period of the second periodic signal increases.

Further, in the irradiation device 20 having the longest period of the second periodic signal, it is preferable that the sum of time To in each period of the first periodic signal is longer than the time for two repeating units. By doing so, the movement of the effective repetition number to the second direction can be reliably contained within one period of the first periodic signal. That is, in the irradiation device 20, it is possible to prevent the next period of the first periodic signal from starting before the end of the movement of the effective repetition number in the second direction. On the other hand, in the irradiation device 20 having the longest period of the second periodic signal, the sum of time To in each period of the first periodic signal is preferably shorter than the time for six repeating units, is more preferably shorter than the time for five repeating units, and is more preferably shorter than the time for three repeating units. Then, the time that does not contribute to effective measurement can be shortened.

As described above, according to the present example, as in the embodiment, a difference in the effective repetition numbers of the second periodic signals before a reference point in each period of the first periodic signal is less than 1 among the plurality of irradiation devices. Therefore, by changing the irradiation direction such that the plurality of irradiation devices 20 scan one area at timings close to each other, the plurality of irradiation devices 20 can be operated under conditions close to each other.

Example 2

Figure 12:
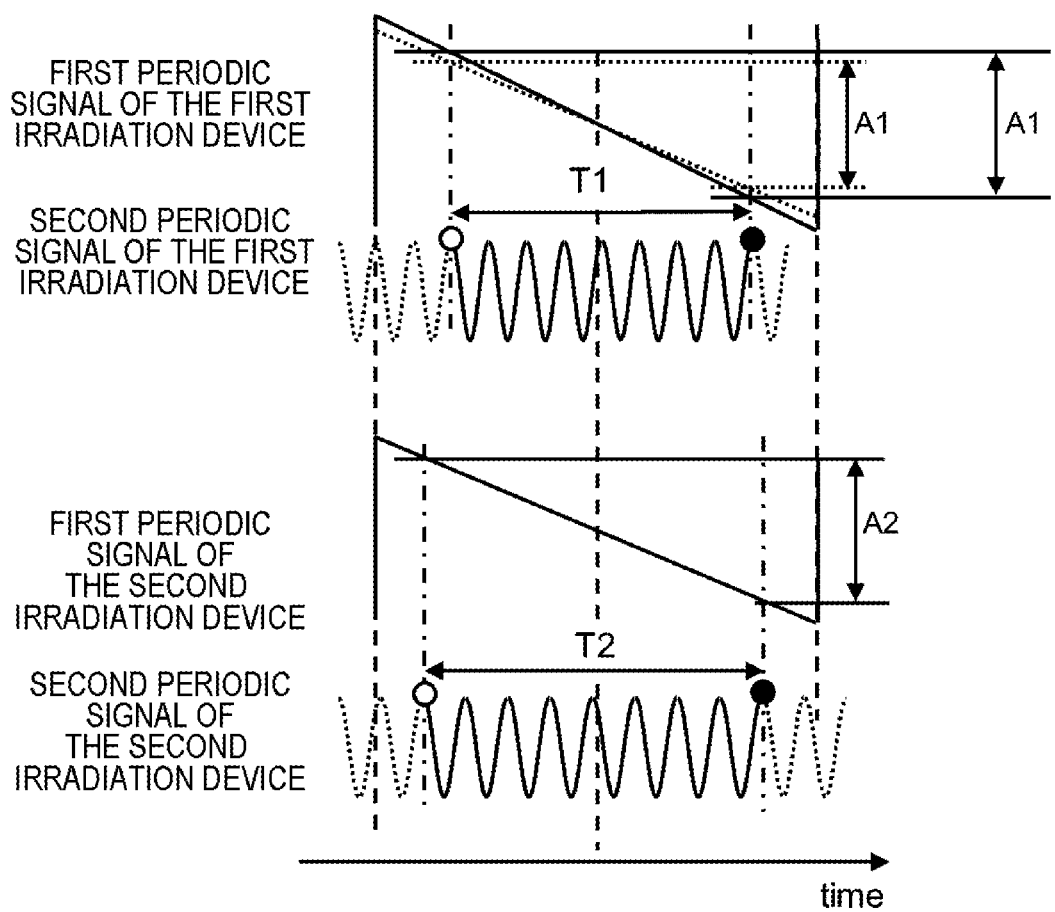
FIG. 12 is a diagram illustrating a relationship between a first periodic signal of a first irradiation device, a second periodic signal of the first irradiation device, a first periodic signal of a second irradiation device, and a second periodic signal of the second irradiation device according to Example 2.

FIG. 12 is a diagram illustrating a relationship between a first periodic signal of a first irradiation device 20, a second periodic signal of the first irradiation device 20, a first periodic signal of a second irradiation device 20, and a second periodic signal 20 of the second irradiation device according to Example 2. In FIG. 12, one period of the first periodic signal is illustrated. Further, in FIG. 12, the second periodic signal in the range of time T1 and time T2 is indicated by a solid line, the second period outside the range of time T1 and time T2 is indicated by a dotted line.

The control device 10 according to the present example is the same as the control device 10 according to Example 1 except that the amplitude of the first periodic signal of the first irradiation device 20 is larger than the amplitude of the first periodic signal of the second irradiation device 20.

By increasing the amplitude of the first periodic signal of the irradiation device 20 having a short period of the second periodic signal, the movement amount of the first periodic signal in the first direction (y direction) per one period can be aligned by the plurality of irradiation devices 20. This will be specifically described below.

In FIG. 12, a signal having the same amplitude as the first periodic signal of the second irradiation device 20 is indicated by a dotted line, overlapping the first periodic signal of the first irradiation device 20. It is assumed that the change amount of the value of the first periodic signal within the time T1 of the first irradiation device 20 is A1, the inclination of the first periodic signal is a1, and the length of the time T1 is t1, and the change amount of the value of the first periodic signal within the time T2 of the second irradiation device 20 is A2, the inclination of the first periodic signal is a2, and the length of the time T2 is t2. Then, it is established that $A1=a1\times t1$ and $A2=a2\times t2$. Here, since $t1>t2$, it is established that $A1>A2$ when $a1=a2$ (that is, a case of a dotted line). In order to set $A2=A1$ (that is, in the case of a solid line), it is necessary to satisfy $a1\times t1=a2\times t2$. Since $t1>t2$ here, the amplitude may be adjusted such that $a1<a2$. Further, when the amplitude of the first periodic signal of the first irradiation device 20 is AA1, the amplitude of the first periodic signal of the second irradiation device 20 is AA2, and the period of the first periodic signal is t, it is established that $AA1=t\times a1$ and $AA2=t\times a2$. Then, in order to satisfy $a1<a2$, $AA1<AA2$ may be set.

Here, each of t1 and t2 is a value obtained by multiplying the number N of effective repetitions by the length of the repeating unit, and further, the length of each repeating unit is proportional to the period of the second periodic signal of each irradiation device 20. Further, a1 and a2 are each proportional to the amplitude of the first periodic signal.

From the above, in order to set $A2=A1$, that is, $a1\times t1=a2\times t2$, it is preferable that the values obtained by multiplying the amplitude of the first periodic signal by the period of the second periodic signal are the same in the plurality of irradiation devices 20. In other words, when an amplitude of the first periodic signal of the first irradiation device 20 is AA1, a frequency of the second periodic signal is f1, an amplitude of the first periodic signal of the second irradiation device is AA2, and a frequency of the second periodic signal is f2, it is preferable that $AA1=(f1/f2)\times AA2$ is established.

As described above, according to the present example, as in the embodiment, a difference in the effective repetition numbers of the second periodic signals before a reference point in each period of the first periodic signal is less than 1 between the plurality of irradiation devices. Therefore, by changing the irradiation direction such that the plurality of irradiation devices 20 scan one area at timings close to each other, the plurality of irradiation devices 20 can be operated under conditions close to each other.

In addition, according to the present example, the amplitude of the first periodic signal of the first irradiation device 20 is larger than the amplitude of the first periodic signal of the second irradiation device 20, among the plurality of irradiation devices 20. Therefore, the widths of changing the irradiation directions of the electromagnetic waves emitted from the plurality of irradiation devices 20 to the first direction can be close to each other.

Example 3

Figure 13:
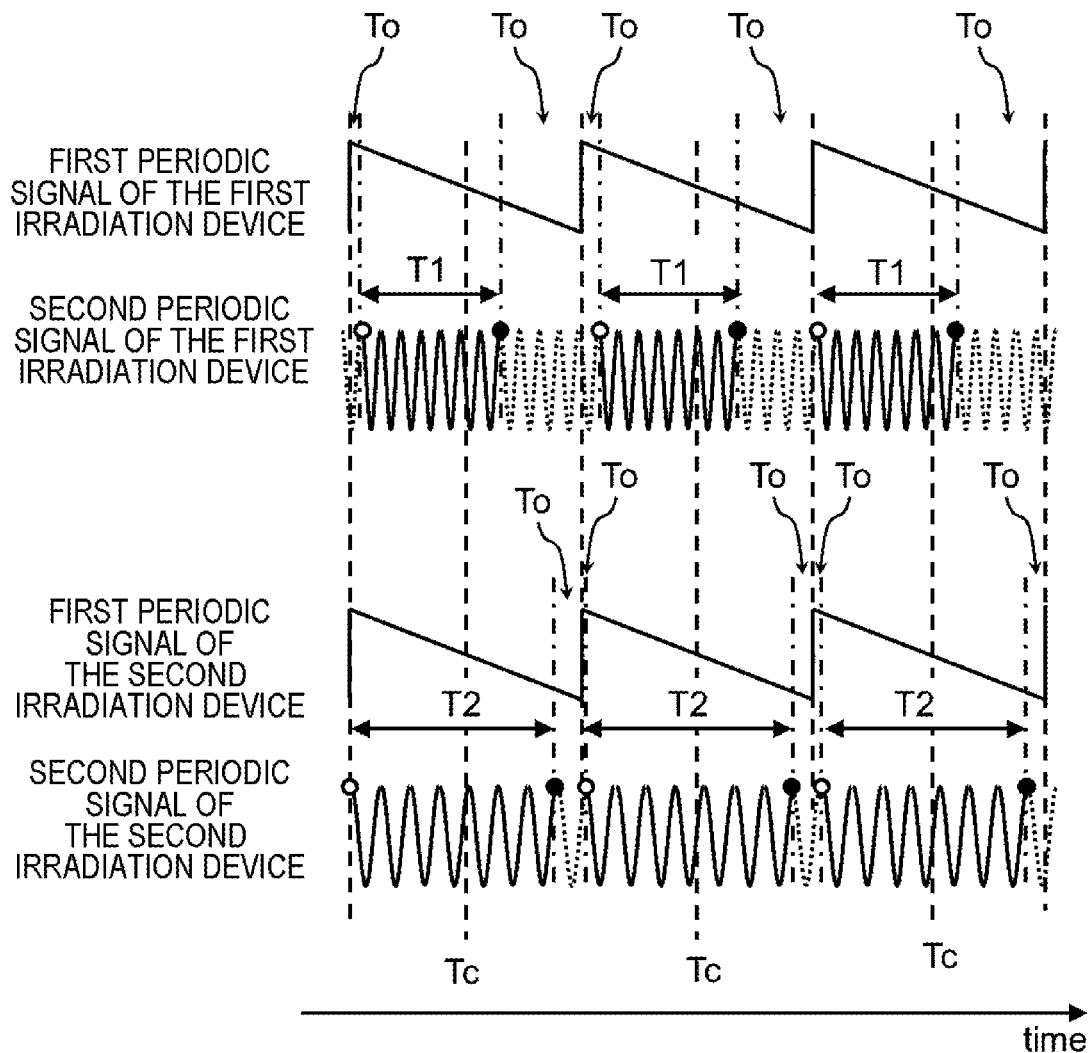
FIG. 13 is a diagram illustrating a relationship between a first periodic signal of a first irradiation device, a second periodic signal of the first irradiation device, a first periodic signal of a second irradiation device, and a second periodic signal of the second irradiation device according to Example 3.

FIG. 13 is a diagram illustrating a relationship between a first periodic signal of a first irradiation device 20, a second periodic signal of the first irradiation device 20, a first periodic signal of a second irradiation device 20, and a second periodic signal 20 of the second irradiation device 20 according to Example 3. The control device 10 according to the present example is the same as the control device 10 according to at least one of Example 1 or Example 2, except for the points described below.

In the present example, a difference in the effective repetition number of the second periodic signal, before a reference point, in each period of the first periodic signal does not need to be less than 1 between the plurality of irradiation devices. Further, in the present example, the first irradiation device 20 is an irradiation device 20 having the shortest period of the second periodic signal among the plurality of irradiation devices 20, and the second irradiation device 20 is an irradiation device 20 having the longest period of the second periodic signal among the plurality of irradiation devices 20.

In the present example, in the first irradiation device 20 and the second irradiation device 20, the time To is present in at least one of the beginning and the end of the time $T_{act\_real}$. Therefore, the time To can be used as a buffer time near the start or end of each frame. Here, the time To is a time during which effective measurement is not performed in the time $T_{act\_real}$.

In the present example, among the plurality of irradiation devices 20, in the irradiation device 20 having the shortest period of the second periodic signal, a movement time To that cannot be counted as the effective repetition number in the second periodic signal is present in at least one of the beginning and the end of each time $T_{act\_real}$ of the first periodic signal. Therefore, the plurality of irradiation devices 20 can change the irradiation directions so as to scan one frame area, for each period of the first periodic signal having the same period. Then, the plurality of measurement devices 30 generate frame data at the same time, that is, at each period of the first periodic signal.

Further, in the present example, the period of the first periodic signal is not an integer multiple of the period of the second periodic signal of the first irradiation device 20. Therefore, In this case, the phase of the second periodic signal of the first irradiation device 20 at the reference point of a certain period of the first periodic signal is different from the phase at the reference point of the next period of the first periodic signal.

The second periodic signal of the first irradiation device 20 includes a period corresponding to movement that is not counted as the effective repetition number. In addition, in the present example, the time T1 of the first irradiation device 20 is closer to the front in each period of the first periodic signal. That is, in each period of the first periodic signal, the effective repetition number n1 before the center Tc of each period of the first periodic signal is larger than the effective repetition number n2 after the center Tc. The difference between the effective repetition number n1 in the first half time and the effective repetition number n2 in the second half time may exceed 1.

In FIG. 13, the start point of the time T1 of the first irradiation device 20 is indicated by a white circle and the end point is indicated by a black circle. The start point of the time T1 is the start point of the period of the second periodic signal that first appears after the start point of the time $T_{act\_real}$ of the first periodic signal. The time T1 includes a predetermined number of repeating units, and the end point of the time T1 is the end point of the last repeating unit included in the time T1. The effective repetition number included in the time T1 may be equal to the number of lines of frame data. The effective repetition number is preset in the control device 10 by, for example, user input.

In the example of FIG. 13, the period of the first periodic signal is not an integer multiple of the period of the second periodic signal of the first irradiation device 20. Since the respective periods of the first periodic signal and the second periodic signal are continuously connected, the phase of the second periodic signal at the start point of the first periodic signal differs for each period of the first periodic signal. Therefore, the length of each time To at the beginning and the end of each time $T_{act\_real}$ of the first periodic signal changes for each period of the first periodic signal.

For example, the control unit 100 determines the timings of the start point and the end point of the time T1 for each period of the first periodic signal as described above. Then, the control unit 100 may further output timing signals indicating the start point and the end point of the time T1, and the irradiation device 20 and the measurement device 30 are input the timing signals. In that case, in the irradiation device 20 and the measurement device 30, the presence or absence of irradiation of electromagnetic waves or the generation of frame data is controlled based on the timing signal.

In the present example, the second periodic signal of the second irradiation device 20 includes the time To. In addition, in the present example, the time T2 of the second periodic signal of the second irradiation device 20 is closer to the front in each period of the first periodic signal. That is, in each period of the first periodic signal, the effective repetition number n1 before the center Tc of each period of the first periodic signal is larger than the effective repetition number n2 after the center Tc. The difference between the effective repetition number n1 in the first half time and the effective repetition number n2 in the second half time may exceed 1.

In FIG. 13, the start point of the time T2 of the second periodic signal of the second irradiation device 20 is indicated by a white circle and the end point is indicated by a black circle. The start point of the time T2 is the start point of the period of the second periodic signal that first appears after the start point of the time $T_{act\_real}$ of the first periodic signal. The time T2 includes a predetermined number of repeating units, and the end point of the time T2 is the end point of the last repeating unit included in the time T2. The effective repetition number included in the time T2 may be the number of lines described in the embodiment. The effective repetition number is preset in the control device 10 by, for example, user input.

The effective repetition number of the second irradiation device 20 included in the time T2 and the effective repetition number of the first irradiation device 20 included in the time T1 are the same as each other. The period of the second periodic signal of the second irradiation device 20 is longer than the period of the second periodic signal of the first irradiation device 20. That is, the time of the repeating unit of the second irradiation device 20 is longer than the time of the repeating unit of the first irradiation device 20. Therefore, the time T2 is longer than the time T1.

In addition, in the present example, the length of the time To of the irradiation device 20 having the shortest period of the second periodic signal among the plurality of irradiation devices 20 is longer than the length of the time To of the irradiation device 20 having the longest period of the second periodic signal.

In the present example, in the second irradiation device 20, the time To is present in at least one of the beginning and the end of each time $T_{act\_real}$ of the first periodic signal. Here, in the example of FIG. 13, the period of the first periodic signal is not an integer multiple of the period of the second periodic signal of the second irradiation device 20. Since the respective periods of the first periodic signal and the second periodic signal are continuously connected, the phase of the second periodic signal at the start point of the first periodic signal differs for each period of the first periodic signal. Therefore, the length of each time To at the beginning and the end of each time $T_{act\_real}$ of the first periodic signal changes for each period of the first periodic signal.

In the second irradiation device 20, by providing the time To in at least one of the beginning and the end of the time $T_{act\_real}$ of the first periodic signal, it is not necessary to make the time $T_{act\_real}$ of the first periodic signal an integer multiple of the period of the second periodic signal of the second irradiation device 20. Therefore, the degree of freedom in setting the period of the first periodic signal is high, and the period of the first periodic signal can be set according to a preferable acquisition interval of frame data or the like. However, in the present example, the period of the first periodic signal may be an integer multiple of the period of the second periodic signal of the second irradiation device 20.

The number of irradiation devices 20 controlled by the control device 10 may be two, or may be three or more. For example, in the present example, the plurality of irradiation devices 20 controlled by the control device 10 include a third irradiation device 20. The period of the second periodic signal of the third irradiation device 20 is longer than the period of the second periodic signal of the first irradiation device 20, and is shorter than the period of the second periodic signal of the second irradiation device 20. The length of time To in the third irradiation device 20 is shorter than the length of time To in the first irradiation device 20 and is longer than the length of time To in the second irradiation device 20.

As described above, according to the present example, In the present example, among the plurality of irradiation devices 20, in the irradiation device 20 having the shortest period of the second periodic signal, a movement time To that cannot be counted as the effective repetition number in the second periodic signal is present in at least one of the beginning and the end of time $T_{act\_real}$ of the first periodic signal. Therefore, by changing the irradiation direction such that the plurality of irradiation devices 20 scan one area at the same time each other, the plurality of irradiation devices 20 can be operated under conditions close to each other.

In addition, according to the present example, even in the second irradiation device 20, a movement time To that cannot be counted as the effective repetition number in the second periodic signal is present in at least one of the beginning and the end of time $T_{act\_real}$ of the first periodic signal. Therefore, the degree of freedom in setting the period of the first periodic signal is high regardless of the period of the second periodic signal of the second irradiation device 20.

Example 4

Figure 14:
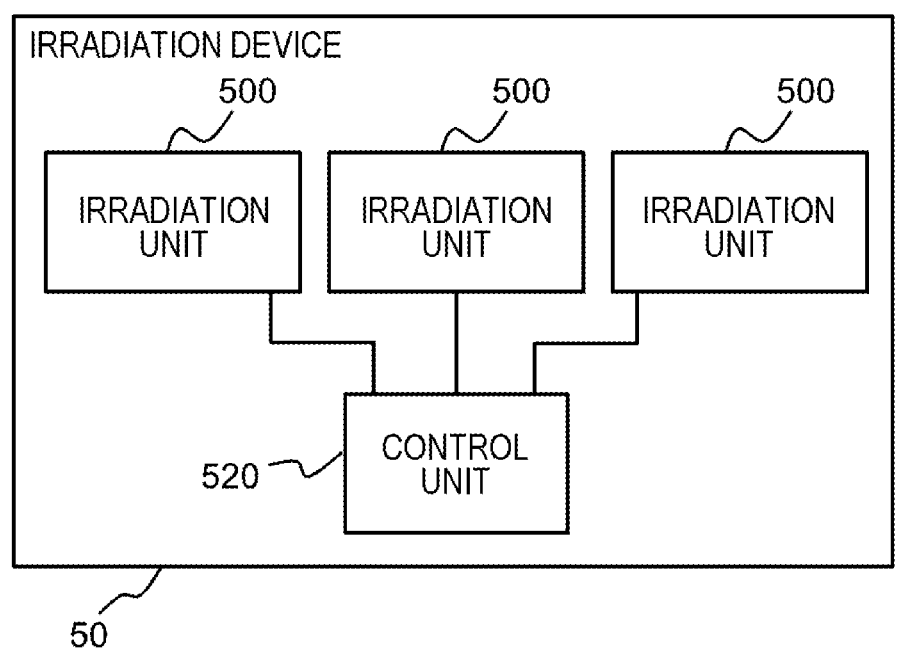
FIG. 14 is a block diagram illustrating a functional configuration of an irradiation device according to Example 4.

FIG. 14 is a block diagram illustrating the functional configuration of an irradiation device 50 according to Example 4. The irradiation device 50 according to the present example includes a plurality of irradiation units 500 and a control unit 520. The irradiation device 50 emits an electromagnetic wave. The control unit 520 controls the plurality of irradiation units 500. The control unit 520 outputs a plurality of first periodic signals for respectively controlling movements of the irradiation directions of the electromagnetic waves to a first direction in the plurality of irradiation units 500, and a plurality of second periodic signals for respectively controlling movements of the irradiation directions of the electromagnetic waves to a second direction in the plurality of irradiation units 500. The periods of the plurality of first periodic signals are the same as each other. The control unit 520 outputs the second periodic signals for a plurality of periods during outputting the first periodic signal for one period. The effective repetition number of the movement of the irradiation direction to the second direction, while the irradiation direction is moved one period to the first direction, is the same for the plurality of irradiation units 500. Then, for example, a difference in the effective repetition numbers of the second periodic signals before a reference point in each period of the first periodic signal is less than 1 among the plurality of irradiation devices.

In the irradiation device 50 according to the present example, the irradiation unit 500 has the same configuration as the irradiation device 20 according to at least one of the embodiment and Examples 1 to 3. Further, the control unit 520 has the same configuration as the control unit 100 according to at least one of the embodiment and Examples 1 to 3. The irradiation device 50 is included in the measurement device that receives the reflected wave of the electromagnetic wave which is emitted from the irradiation device 50 and is reflected by the object, and performs the measurement.

As described above, according to the present example, for example, as in the embodiment, a difference in the effective repetition numbers of the second periodic signals before a reference point in each period of the first periodic signal is less than 1 among the plurality of irradiation units. Therefore, by changing the irradiation direction such that the plurality of irradiation units 500 scan one area at timings close to each other, the plurality of irradiation units 500 can be operated under conditions close to each other.

Further, according to the present example, as in the third example, for example, among the plurality of irradiation units 500, in the irradiation unit 500 having the shortest period of the second periodic signal, a movement time To that cannot be counted as the effective repetition number in the second periodic signal is present in at least one of the beginning and the end of time $T_{act\_real}$ of the first periodic signal. Therefore, by changing the irradiation direction such that the plurality of irradiation units 500 scan one area at the same time as each other, the plurality of irradiation units 500 can be operated under conditions close to each other.

Although the embodiment and examples have been described above with reference to the drawings, these are examples of the present invention, and various configurations other than the above can be adopted. For example, each embodiment and each example described above can be combined within a range in which the contents do not contradict each other.

Hereinafter, examples of reference aspects will be additionally described.

1-1. A control device including:
a control unit which controls a plurality of irradiation devices that emit electromagnetic waves,
in which the control unit outputs a plurality of first periodic signals for respectively controlling movements of irradiation directions of the electromagnetic waves to a first direction in the plurality of irradiation devices, and a plurality of second periodic signals for respectively controlling movements of the irradiation directions of the electromagnetic waves in the plurality of irradiation devices to a second direction,
in which periods of the plurality of first periodic signals are the same as each other,
in which the control unit outputs the second periodic signals for a plurality of periods during outputting the first periodic signals for one period,
in which effective repetition numbers of movement of the irradiation directions to the second direction while the irradiation directions are moved one period to the first direction are the same for the plurality of irradiation devices, and
in which a difference in the effective repetition numbers of the second periodic signals before a reference point in each period of the first periodic signal is less than 1 between the plurality of irradiation devices.

1-2. The control device according to 1-1,
in which the electromagnetic wave is not emitted from the irradiation device during a time of movement to the second direction that is not counted as the effective repetition number.

1-3. The control device according to 1-1 or 1-2,
in which the irradiation device is included in the measurement device that receives the reflected wave of the electromagnetic wave, which is emitted from the irradiation device and is reflected by the object, and performs a measurement, and
in which measurement is not performed by the measurement device during the time of movement to the second direction that is not counted as the effective repetition number.

1-4. The control device according to any one of 1-1 to 1-3,
in which the plurality of irradiation devices include a first irradiation device, and a second irradiation device in which a period of the second periodic signal is longer than that of the first irradiation device, and
in which the amplitude of the first periodic signal of the first irradiation device is larger than the amplitude of the first periodic signal of the second irradiation device.

1-5. The control device according to 1-4,
in which when an amplitude of the first periodic signal of the first irradiation device is AA1, a frequency of the second periodic signal is f1, an amplitude of the first periodic signal of the second irradiation device is AA2, and a frequency of the second periodic signal is f2, it is established that AA1=(f1/f2)×AA2.

1-6. The control device according to any one of 1-1 to 1-5,
in which the reference point is a center point of time of each period of the first periodic signal.

2-1. An irradiation device including:
a plurality of irradiation units that emit electromagnetic waves; and
a control unit which controls the plurality of irradiation units,
in which the control unit controls outputs a plurality of first periodic signals for respectively controlling movements of the irradiation directions of the electromagnetic waves from the plurality of irradiation units to a first direction, and a plurality of second periodic signals for respectively controlling movements of the irradiation directions of the electromagnetic waves to a second direction in the plurality of irradiation units,
in which periods of the plurality of first periodic signals are the same as each other,
in which the control unit outputs the second periodic signals for a plurality of periods during outputting the first periodic signals for one period,
in which the effective repetition number of the movement of the irradiation direction to the second direction while the irradiation direction is moved one period to the first direction is the same for the plurality of irradiation units, and in which a difference in the effective repetition numbers of the second periodic signals before a reference point in each period of the first periodic signal is less than 1 between the plurality of irradiation units.

2-2. The irradiation device according to 2-1, in which the electromagnetic wave is not emitted from the irradiation unit during a time of movement to the second direction that is not counted as the effective repetition number.

2-3. The irradiation device according to 2-1 or 2-2, in which the irradiation unit is included in the measurement device that receives the reflected wave of the electromagnetic wave, which is emitted from the irradiation unit and is reflected by the object, and performs a measurement, and in which measurement is not performed by the measurement device during the time of movement to the second direction that is not counted as the effective repetition number.

2-4. The irradiation device according to any one of 2-1 to 2-3, in which the plurality of irradiation units include a first irradiation unit, and a second irradiation unit in which a period of the second periodic signal is longer than that of the first irradiation unit, and in which the amplitude of the first periodic signal of the first irradiation unit is larger than the amplitude of the first periodic signal of the second irradiation unit.

2-5. The irradiation device according to 2-4, in which when an amplitude of the first periodic signal of the first irradiation unit is AA1, a frequency of the second periodic signal is f1, an amplitude of the first periodic signal of the second irradiation unit is AA2, and a frequency of the second periodic signal is f2, it is established that $AA1=(f1/f2)\times AA2$.

2-6. The irradiation device according to any one of 2-1 to 2-5, in which the reference point is a center point of time of each period of the first periodic signal.

3-1. A control method including:

a control step of controlling a plurality of irradiation devices that emit electromagnetic waves, in which in the control step, a plurality of first periodic signals for respectively controlling movements of irradiation directions of the electromagnetic waves to a first direction in the plurality of irradiation devices, and a plurality of second periodic signals for respectively controlling movements of the irradiation directions of the electromagnetic waves to a second direction in the plurality of irradiation devices are output, in which periods of the plurality of first periodic signals are the same as each other, in which in the control step, the second periodic signals for a plurality of periods are output during the first periodic signals for one period are output, in which effective repetition numbers of movement of the irradiation directions to the second direction while the irradiation directions are moved one period to the first direction are the same for the plurality of irradiation devices, and in which a difference in the effective repetition numbers of the second periodic signals before a reference point in each period of the first periodic signal is less than 1 between the plurality of irradiation devices.

3-2. The control method according to 3-1, in which the electromagnetic wave is not emitted from the irradiation device during a time of movement to the second direction that is not counted as the effective repetition number.

3-3. The control method according to 3-1 or 3-2, in which the irradiation device is included in the measurement device that receives the reflected wave of the electromagnetic wave, which is emitted from the irradiation device and is reflected by the object, and performs a measurement, and in which measurement is not performed by the measurement device during the time of movement to the second direction that is not counted as the effective repetition number.

3-4. The control method according to any one of 3-1 to 3-3, in which the plurality of irradiation devices include a first irradiation device, and a second irradiation device in which a period of the second periodic signal is longer than that of the first irradiation device, and in which the amplitude of the first periodic signal of the first irradiation device is larger than the amplitude of the first periodic signal of the second irradiation device.

3-5. The control method according to 3-4, in which when an amplitude of the first periodic signal of the first irradiation device is AA1, a frequency of the second periodic signal is f1, an amplitude of the first periodic signal of the second irradiation device is AA2, and a frequency of the second periodic signal is f2, it is established that $AA1=(f1/f2)\times AA2$.

3-6. The control method according to any one of 3-1 to 3-5, in which the reference point is a center point of time of each period of the first periodic signal.

4-1. A computer program for causing a computer to function as a control unit which controls a plurality of irradiation devices that emit electromagnetic waves, in which the control unit outputs a plurality of first periodic signals for respectively controlling movements of irradiation directions of the electromagnetic waves to a first direction in the plurality of irradiation devices, and a plurality of second periodic signals for respectively controlling movements of the irradiation directions of the electromagnetic waves to a second direction in the plurality of irradiation devices, in which periods of the plurality of first periodic signals are the same as each other, in which the control unit outputs the second periodic signals for a plurality of periods during outputting the first periodic signals for one period, in which effective repetition numbers of movement of the irradiation directions to the second direction while the irradiation directions are moved one period to the first direction are the same for the plurality of irradiation devices, and in which a difference in the effective repetition numbers of the second periodic signals before a reference point in each period of the first periodic signal is less than 1 between the plurality of irradiation devices.

4-2. The computer program according to 4-1, in which the electromagnetic wave is not emitted from the irradiation device during a time of movement to the second direction that is not counted as the effective repetition number.

4-3. The computer program according to 4-1 or 4-2,
in which the irradiation device is included in the measurement device that receives the reflected wave of the electromagnetic wave, which is emitted from the irradiation device and is reflected by the object, and performs a measurement, and
in which measurement is not performed by the measurement device during the time of movement to the second direction that is not counted as the effective repetition number.

4-4. The computer program according to any one of 4-1 to 4-3,
in which the plurality of irradiation devices include a first irradiation device, and a second irradiation device in which a period of the second periodic signal is longer than that of the first irradiation device, and
in which the amplitude of the first periodic signal of the first irradiation device is larger than the amplitude of the first periodic signal of the second irradiation device.

4-5. The computer program according to 4-4,
in which when an amplitude of the first periodic signal of the first irradiation device is AA1, a frequency of the second periodic signal is f1, an amplitude of the first periodic signal of the second irradiation device is AA2, and a frequency of the second periodic signal is f2, it is established that $AA1=(f1/f2) \times AA2$.

4-6. The computer program according to any one of 4-1 to 4-5,
in which the reference point is a center point of time of each period of the first periodic signal.

This application claims priority based on Japanese Patent Application No. 2018-059344 filed on Mar. 27, 2018, and the disclosure of which is incorporated herein in its entirety.

The invention claimed is:

1. A control device comprising:
a control unit which controls a plurality of irradiation devices that emit electromagnetic waves,
wherein the control unit outputs a plurality of first periodic signals for respectively controlling movements of irradiation directions of the electromagnetic waves to a first direction in the plurality of irradiation devices, and a plurality of second periodic signals for respectively controlling movements of the irradiation directions of the electromagnetic waves in the plurality of irradiation devices to a second direction,
wherein periods of the plurality of first periodic signals are the same as each other,
wherein the control unit outputs the second periodic signals for a plurality of periods during outputting the first periodic signals for one period,
wherein effective repetition numbers of movement of the irradiation directions to the second direction while the irradiation directions are moved one period to the first direction are the same for the plurality of irradiation devices,
wherein a difference in the effective repetition numbers of the second periodic signals before a reference point in each period of the first periodic signal is less than 1 between the plurality of irradiation devices, and
wherein the electromagnetic wave is not emitted from the irradiation device during a time of movement to the second direction that is not counted as the effective repetition number.

2. The control device according to claim 1, wherein the irradiation device is included in a measurement device that receives a reflected wave of the electromagnetic wave, which is emitted from the irradiation device and is reflected by an object, and performs a measurement, and
wherein measurement is not performed by the measurement device during the time of movement to the second direction that is not counted as the effective repetition number.

3. The control device according to claim 1, wherein the plurality of irradiation devices include a first irradiation device and a second irradiation device, and a period of the second periodic signal of the second irradiation device is longer than a period of the second periodic signal of the first irradiation device, and
wherein an amplitude of the first periodic signal of the first irradiation device is larger than an amplitude of the first periodic signal of the second irradiation device.

4. The control device according to claim 3, wherein, when the amplitude of the first periodic signal of the first irradiation device is AA1, a frequency of the second periodic signal of the first irradiation device is f1, the amplitude of the first periodic signal of the second irradiation device of the second irradiation device is AA2, and a frequency of the second periodic signal is f2, it is established that $AA1=(f1/f2) \times AA2$.

5. The control device according to claim 1, wherein the reference point is a center point of time of each period of the first periodic signal.

6. An irradiation device comprising:
a plurality of irradiation units which emit electromagnetic waves; and
a control unit which controls the plurality of irradiation units,
wherein the control unit controls outputs a plurality of first periodic signals for respectively controlling movements of a irradiation directions of the electromagnetic waves from the plurality of irradiation units to a first direction, and a plurality of second periodic signals for respectively controlling movements of the irradiation directions of the electromagnetic waves to a second direction in the plurality of irradiation units,
wherein periods of the plurality of first periodic signals are the same as each other,
wherein the control unit outputs the second periodic signals for a plurality of periods during outputting the first periodic signals for one period,
wherein an effective repetition number of the movement of the irradiation direction to the second direction while the irradiation direction is moved one period to the first direction is the same for the plurality of irradiation units,
wherein a difference in the effective repetition numbers of the second periodic signals before a reference point in each period of the first periodic signal is less than 1 between the plurality of irradiation units, and
wherein the electromagnetic wave is not emitted from the irradiation device during a time of movement to the second direction that is not counted as the effective repetition number.

7. A control method comprising:
a control step of controlling a plurality of irradiation devices that emit electromagnetic waves,
wherein in the control step, a plurality of first periodic signals for respectively controlling movements of irradiation directions of the electromagnetic waves to a first direction in the plurality of irradiation devices, and a plurality of second periodic signals for respectively controlling movements of the irradiation directions of the electromagnetic waves to a second direction in the plurality of irradiation devices are output, wherein periods of the plurality of first periodic signals are the same as each other, wherein in the control step, the second periodic signals for a plurality of periods are output during the first periodic signals for one period are output, wherein effective repetition numbers of movement of the irradiation directions to the second direction while the irradiation directions are moved one period to the first direction are the same for the plurality of irradiation devices, wherein a difference in the effective repetition numbers of the second periodic signals before a reference point in each period of the first periodic signal is less than 1 between the plurality of irradiation devices, and wherein the electromagnetic wave is not emitted from the irradiation device during a time of movement to the second direction that is not counted as the effective repetition number.

8. A storage medium storing a program executable by a computer, the program causing the computer to function as a control unit which controls a plurality of irradiation devices that emit electromagnetic waves, wherein the control unit outputs a plurality of first periodic signals for respectively controlling movements of irradiation directions of the electromagnetic waves to a first direction in the plurality of irradiation devices, and a plurality of second periodic signals for respectively controlling movements of the irradiation directions of the electromagnetic waves to a second direction in the plurality of irradiation devices, wherein periods of the plurality of first periodic signals are the same as each other, wherein the control unit outputs the second periodic signals for a plurality of periods during outputting the first periodic signals for one period, wherein effective repetition numbers of movement of the irradiation directions to the second direction while the irradiation directions are moved one period to the first direction are the same for the plurality of irradiation devices, wherein a difference in the effective repetition numbers of the second periodic signals before a reference point in each period of the first periodic signal is less than 1 between the plurality of irradiation devices, and wherein the electromagnetic wave is not emitted from the irradiation device during a time of movement to the second direction that is not counted as the effective repetition number.

* * * * *